United States Patent
H et al.

(10) Patent No.: US 10,467,028 B2
(45) Date of Patent: Nov. 5, 2019

(54) TECHNOLOGIES FOR MEMORY MARGIN AWARE RELIABLE SOFTWARE EXECUTION

(71) Applicant: Intel Corporation, Santa Clara, CA (US)

(72) Inventors: Krishnaprasad H, Bangalore (IN); Ramkumar Jayaraman, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 15/465,210

(22) Filed: Mar. 21, 2017

(65) Prior Publication Data

US 2018/0276010 A1 Sep. 27, 2018

(51) Int. Cl.
| | |
|---|---|
| *G06F 9/44* | (2018.01) |
| *G06F 9/445* | (2018.01) |
| *G06F 9/4401* | (2018.01) |
| *G06F 9/48* | (2006.01) |
| *G06F 3/06* | (2006.01) |

(52) U.S. Cl.
CPC ........ *G06F 9/44557* (2013.01); *G06F 3/0604* (2013.01); *G06F 3/0632* (2013.01); *G06F 3/0683* (2013.01); *G06F 9/4403* (2013.01); *G06F 9/4406* (2013.01); *G06F 9/4843* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505

See application file for complete search history.

(56) References Cited

U.S. PATENT DOCUMENTS

| | | | | |
|---|---|---|---|---|
| 8,312,258 B2 * | 11/2012 | Xing | ...................... | G06F 9/4403 713/1 |
| 9,003,223 B2 * | 4/2015 | Ackaret | .............. | G06F 12/0653 714/6.1 |
| 9,620,184 B1 * | 4/2017 | Bialas, Jr. | ............ | G11C 29/021 |

(Continued)

*Primary Examiner* — Zahid Choudhury
(74) *Attorney, Agent, or Firm* — Barnes & Thornburg LLP (57) ABSTRACT

Technologies for reliable software execution include a computing device having a memory that includes multiple ranks. The computing device trains the ranks of the memory and determines a consolidated memory score for each rank. Each consolidated memory score is indicative of a margin of the corresponding rank. The computing device identifies a higher-margin address range using the consolidated memory scores. The higher-margin memory address range is mapped to a higher-margin memory rank. The computing device loads high-priority software into the higher-margin memory address range. The high-priority software may include an operating system or a critical application. A pre-boot firmware environment may publish the consolidated memory scores to a higher-level software component, such as the operating system. The pre-boot firmware environment may map a predetermined address range to the higher-margin memory rank. A critical application may request to be loaded into a higher-margin address range. Other embodiments are described and claimed.

25 Claims, 5 Drawing Sheets

(56) References Cited

U.S. PATENT DOCUMENTS

| | | | |
|---|---|---|---|
| 2008/0091871 A1* | 4/2008 | Bennett | G06F 12/0246 711/103 |
| 2009/0019243 A1* | 1/2009 | Hur | G06F 1/3225 711/158 |
| 2012/0185859 A1* | 7/2012 | Kashiwaya | G06F 9/30076 718/100 |
| 2015/0154082 A1* | 6/2015 | Dasari | G06F 11/1666 711/162 |
| 2016/0342343 A1* | 11/2016 | Yen | G06F 12/10 |
| 2018/0122434 A1* | 5/2018 | Lee | G11C 5/04 |

* cited by examiner

TECHNOLOGIES FOR MEMORY MARGIN AWARE RELIABLE SOFTWARE EXECUTION

BACKGROUND

Typical computing devices use high-speed memory devices such as double-data rate (DDR) memory. Transient signal errors that may occur while accessing memory negatively impact system reliability. For example, memory errors may be caused by signal misalignment due to process, temperature, and voltage variations. Typical computing devices may attempt to detect and correct memory errors after they occur at various abstraction layers of the memory subsystem, from hardware to software. For example, computing devices may include memory reliability, availability, and serviceability (RAS) features such as error-correcting code (ECC), memory migration, or sparing. As another example, computing devices may perform write CRC or integrity checks over critical data structures.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
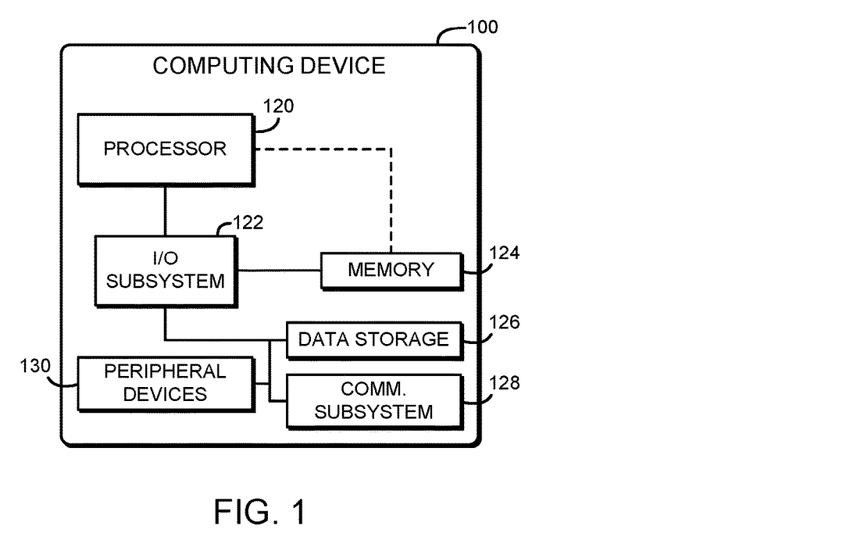
FIG. 1 is a simplified block diagram of at least one embodiment of a computing device for reliable software execution.

Referring now to FIG. 1, an illustrative computing device 100 for reliable software execution is shown. In use, as described below, the computing device 100 performs memory training in response to a platform boot and then generates margin data for each memory rank. The margin data may include timing margin data and/or voltage margin data. Higher margins indicate that the associated memory rank has a higher tolerance to signal misalignment (e.g., due to process, temperature, and voltage variations). The computing device 100 uses the margin data to load critical software components such as the operating system, critical firmware components, and/or critical user applications into physical memory addresses that are mapped to memory ranks with higher margins. For non-relocatable software, the computing device 100 may adjust the physical memory map so that predetermined address ranges are mapped to the memory ranks with the best margins. Thus, by placing critical or frequently accessed software in memory ranks with higher margins, the computing device 100 may reduce or prevent the occurrence of memory errors in critical software. Thus, the computing device 100 may improve overall system stability and reliability as compared to traditional devices that do not consider memory margin when placing software components. Additionally, the computing device 100 may improve system reliability using existing components, with no additional cost in terms of hardware (e.g., silicon area or board components), software, performance, or power.

The computing device 100 may be embodied as any type of device capable of performing the functions described herein. For example, the computing device 100 may be embodied as, without limitation, a computer, a server, a workstation, a laptop computer, a tablet computer, a notebook computer, a mobile computing device, a smartphone, a wearable computing device, a multiprocessor system, and/or a consumer electronic device. As shown in FIG. 1, the illustrative computing device 100 includes a processor 120, an I/O subsystem 122, a memory 124, and a data storage device 126. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 124 may be directly coupled to the processor 120, for example via an integrated memory controller hub. Additionally, in some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 128, which may be embodied as any communication circuit, device, or collection thereof, capable of enabling communications between the computing device 100 and other remote devices over a computer network (not shown). The communications subsystem 128 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

As shown, the computing device 100 may further include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

Figure 2:
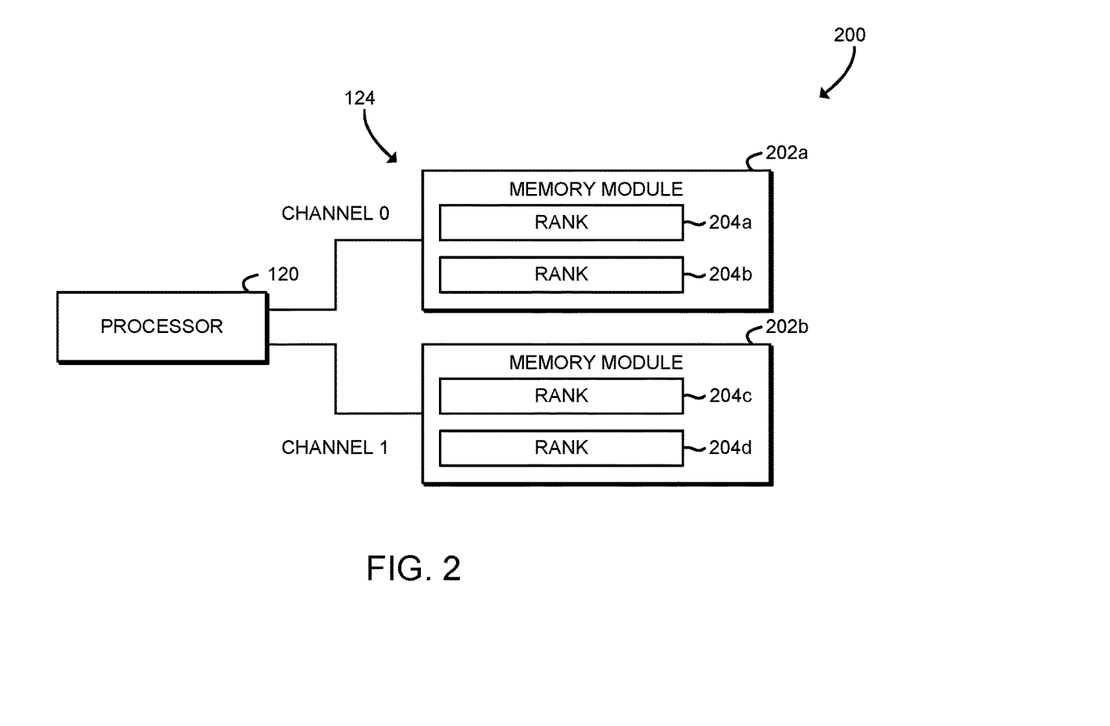
FIG. 2 is a simplified block diagram of a memory subsystem of the computing device of FIG. 1.

Referring now to FIG. 2, diagram 200 shows an illustrative embodiment of a memory subsystem of the computing device 100. As shown, the memory 124 includes two memory modules 202a, 202b. Each memory module 202 includes two memory ranks 204. Each rank 204 includes one or more memory devices (e.g., DRAM chips) that may be accessed as a single rank. The ranks 204 may be accessed, for example, using a chip select (CS) signal. As shown, each of the memory modules 202 communicates with the processor 120 using a dedicated memory channel. The memory modules 202 are illustratively dual inline memory modules (DIMMs). In other embodiments, the memory modules 202 may be embodied as any other memory module, card, or other component that includes multiple memory ranks 204. Additionally, although illustrated as including two modules 202 and four ranks 204, it should be understood that in other embodiments the memory 124 may include a different number of modules 202 and/or ranks 204.

Figure 3:
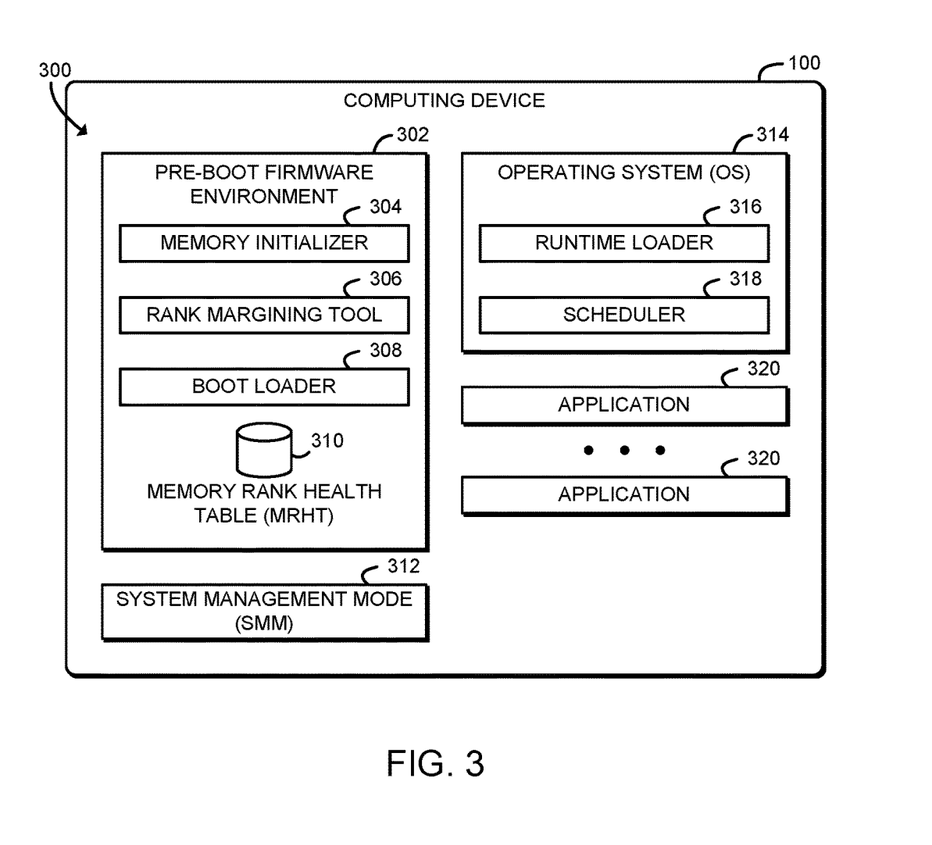
FIG. 3 is a simplified block diagram of at least one embodiment of an environment of the computing device of FIGS. 1 and 2.

Referring now to FIG. 3, in an illustrative embodiment, the computing device 100 establishes an environment 300 during operation. The illustrative environment 300 includes a pre-boot firmware environment 302, a system management mode (SMM) 312, an operating system 314, and one or more applications 320. The pre-boot firmware environment 302 further includes a memory initializer 304, a rank margining tool 306, and a boot loader 308. The operating system 314 further includes a runtime loader 316 and a scheduler 318. The various components of the environment 300 may be embodied as hardware, firmware, software, or a combination thereof. As such, in some embodiments, one or more of the components of the environment 300 may be embodied as circuitry or collection of electrical devices (e.g., memory initializer circuitry 304, rank margining tool circuitry 306, boot loader circuitry 308, runtime loader circuitry 316 and/or scheduler circuitry 318). It should be appreciated that, in such embodiments, one or more of the memory initializer circuitry 304, the rank margining tool circuitry 306, the boot loader circuitry 308, the runtime loader circuitry 316 and/or the scheduler circuitry 318 may form a portion of the processor 120, the I/O subsystem 122, and/or other components of the computing device 100. Additionally, in some embodiments, one or more of the illustrative components may form a portion of another component and/or one or more of the illustrative components may be independent of one another.

The pre-boot firmware environment 302 may be embodied as any pre-boot firmware environment that initializes and configures components of the computing device 100 prior to passing control of the computing device 100 to the operating system 314. For example, the pre-boot firmware environment 302 may be embodied as or otherwise include a pre-EFI initialization (PEI) environment, a unified extensible firmware interface (UEFI) compliant firmware environment, a Core Boot firmware, a UBOOT firmware, and/or a non-UEFI firmware such as legacy BIOS.

The memory initializer 304 is configured to train the ranks 204 of the memory 124. The ranks 204 may be trained, for example, in response to booting the computing device 100.

The rank margining tool 306 is configured to determine a consolidated memory score (CMS) for each rank 204 of the memory in response to training ranks 204. Each CMS is indicative of a margin of the corresponding rank 204 such as a timing margin and/or a voltage margin. Each CMS may be determined as a weighted average of the elements of a normalized margin range vector. In some embodiments, the CMS values may be determined using any other computation model, such as linear regression, polynomial regression, mapping table, or other non-linear models. The rank margining tool 306 may be further configured to publish CMS data to a higher-level software component of the computing device 100, such as the boot loader 308 and/or the operating system 314. In some embodiments, the CMS data may be exported to a firmware table, such as a memory rank health table (MRHT) 310. In some embodiments, the CMS data may be published by installing a firmware interface to access the CMS data.

The boot loader 308 is configured to identify a higher-margin memory address range using the CMS data. The higher-margin memory address range is mapped to a higher-margin memory rank 204. The boot loader 308 is further configured to load a high-priority software component into the higher-margin memory address range. The high-priority software component may include, for example, the SMM 312 or the operating system 314. The boot loader 308 may be further configured to map a predetermined address range to the higher-margin memory rank 204 and to load the operating system 314 into the predetermined address range.

The operating system 314 may be embodied as any operating system, hypervisor, virtual machine monitor, or other control structure of the computing device 100. The operating system 314 takes control of the computing device 100 after the pre-boot firmware environment 302 terminates boot services. The SMM 312 may be embodied as any code or data that is accessible to the computing device 100 in response to a system management interrupt (SMI). The SMM 312 may not be accessible to the operating system 314 and/or the pre-boot firmware environment 302.

The runtime loader 316 is configured to identify one or more higher-margin memory address ranges using the CMS data in response to loading the operating system 314. As described above, each higher-margin memory address range is mapped to a higher-margin memory rank 204. The runtime loader 316 may be configured to access the CMS data published by the pre-boot firmware environment 302. The runtime loader 316 is further configured to load high-priority software components into the one or more higher-margin memory address ranges. The high-priority software components may include operating system 314 data structures, drivers or other loadable modules of the operating system 314, and/or high-priority user-mode applications 320.

The scheduler 318 is configured to execute user-mode applications 320. Each user-mode application 320 may request the operating system 314 to load the user-mode application 320 to a higher-margin memory address range. The operating system 314 may load the user-mode application 320 into a higher-margin memory address range as described above in response to a request from the user-mode application 320.

Figure 4:
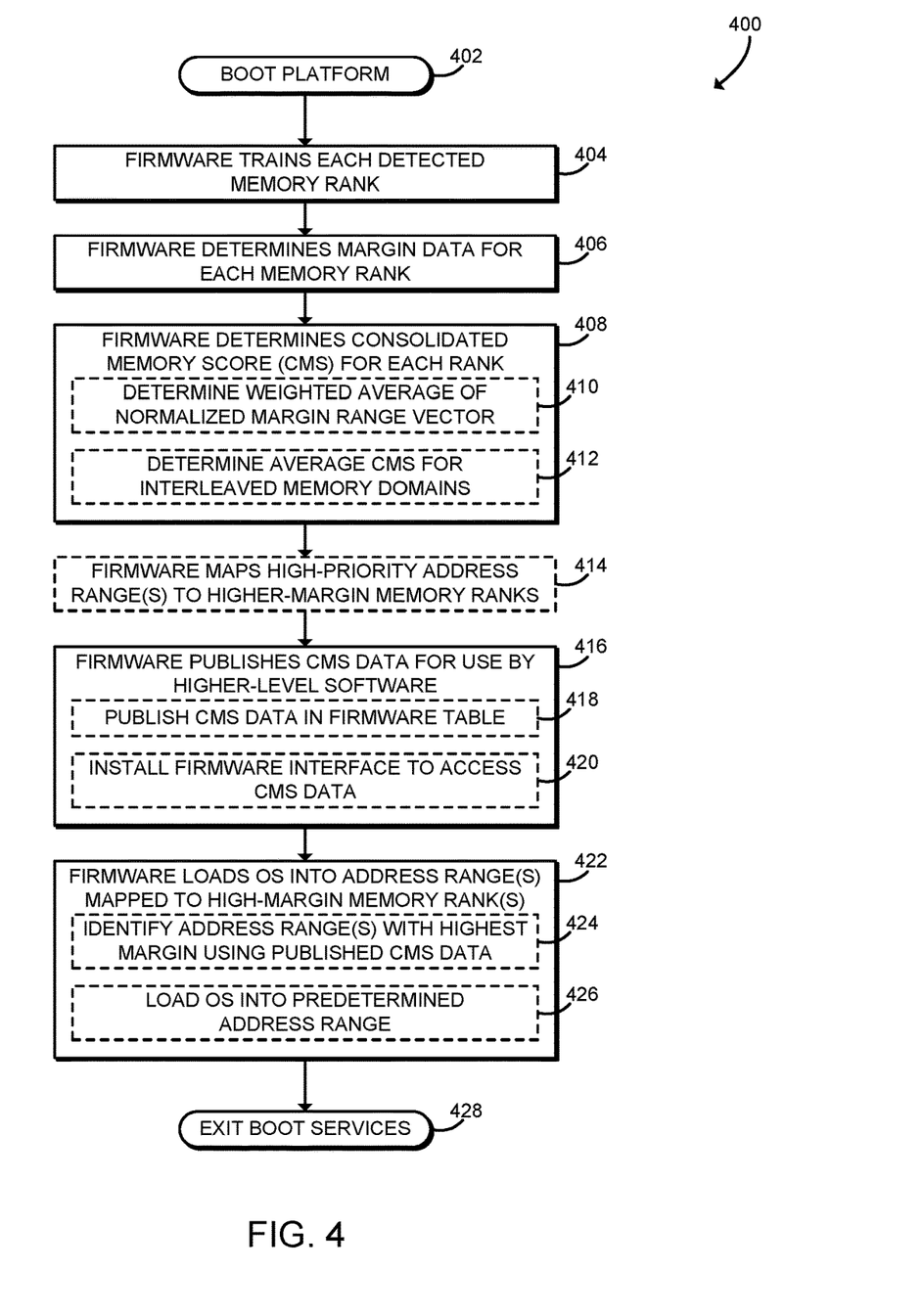
FIG. 4 is a simplified flow diagram of at least one embodiment of a method for boot memory management that may be executed by the computing device of FIGS. 1-3.

Referring now to FIG. 4, in use, the computing device 100 may execute a method 400 for boot memory management. It should be appreciated that, in some embodiments, the operations of the method 400 may be performed by one or more components of the environment 300 of the computing device 100 as shown in FIG. 3. The method 400 begins in block 402, in which the computing device 100 boots. The computing device 100 may boot in response to powering on, in response to a reset, or in response to any other platform boot event that causes the memory 124 to be initialized. In response to booting the platform, the pre-boot firmware environment 302 of the computing device 100 is in control of the computing device 100.

In block 404, the firmware environment 302 of the computing device 100 trains each detected memory rank 204 of the computing device 100. Memory training tunes various transmission and reception parameters of the memory 124. The values for each memory parameter may be stored in registers of the memory controller or otherwise programmed to the computing device 100.

In block 406, the firmware environment 302 of the computing device 100 determines margin data for each memory rank 204. Each rank 204 has a different electrical signal path to the processor 120 and/or the I/O subsystem 122, and thus may have a different associated margin. The margin data may include any data indicative of the tolerance of the particular memory rank 204 to signal misalignment. For example, the margin data may include left- and right-side timing margin information, low and high voltage information, or other information for both reception and transmission that indicates how resistant the memory rank 204 is to signaling errors. The margin data may indicate the length in time and/or the amount in voltage of valid data that is read or transmitted. Graphically, the margin data may be represented as an "eye pattern," with time represented on the x-axis and voltage on the y-axis. Larger margin values may be represented as a larger opening in the eye pattern. The margin data may be stored in one or more internal data structures of the firmware environment 302.

In block 408, the firmware environment 302 of the computing device 100 determines a consolidated memory score (CMS) for each memory rank 204. The CMS is indicative of the margin of the corresponding memory rank 204, and is therefore also indicative of the resistance of the corresponding memory rank 204 to errors caused by signal misalignment. In some embodiments, in block 410, the computing device 100 may determine the CMS as a weighted average of a normalized margin range vector. The margin range vector includes values indicative of timing margin and voltage margin for both transmission and reception for a particular memory rank 204. For example, the margin rank vector may be generated using Equation 1, below. In Equation 1, rxDqLeft and rxDqRight represent the time axis left and right boundaries of valid read data and may be expressed, for example, in pi-ticks. Similarly, txDqLeft, and txDqRight represent the time axis left and right boundaries of valid write data and may be expressed in pi-ticks. In Equation 1, rxVrefLow and rxVrefHigh are indicative of the read voltage margin, and txVrefLow and txVrefHigh are indicative of the write voltage margin. The weighted average may be determined using a weight vector as shown in Equation 2, below. Particular values for the weights may be determined experimentally or using any other appropriate technique. The CMS value may be determined by normalizing each element of the margin range vector to a maximum possible CMS score and then determining the weighted average of the elements, as shown in Equation 3, below.

$$MarginRangeVector = \begin{bmatrix} abs(rxDqLeft - rxDqRight) \\ abs(txDqLeft - txDqRight) \\ abs(rxVrefLow - rxVrefHigh) \\ abs(txVrefLow - txVrefHigh) \end{bmatrix} \quad (1)$$

$$Weights = [w_0 \ w_1 \ w_2 \ w_3] \quad (2)$$

$$CMS = MarginRangeVector \cdot Weights \quad (3)$$

In some embodiments, in block 412, the computing device 100 may determine an average CMS for each interleaved memory domain of the computing device 100. For example, the computing device 100 may include one or more of channel interleaving, module interleaving, and/or rank interleaving. The average CMS value for all participating rank members (e.g., channels, modules 202, and/or ranks 204) may be used as the overall CMS score for the entire interleaved domain. Additionally or alternatively, although illustrated as being determined as a weighted average, in some embodiments, the CMS values may be determined using any other computation model, such as linear regression, polynomial regression, mapping table, or other non-linear models. Additionally or alternatively, in some embodiments, the CMS values may be determined as the area enclosed within the eye pattern.

In some embodiments, in block 414, the pre-boot firmware environment 302 may map high-priority physical address ranges to higher-margin memory ranks. The high-priority physical address ranges may include one or more address ranges in which a non-relocatable operating system 314 or other software expects to be loaded. For example, a non-relocatable Linux kernel may expect to be loaded in the 0-2 GB physical address range. Accordingly, the pre-boot firmware environment 302 may map the rank 204 with the highest CMS score to the 0-2 GB physical address range.

In block 416, the pre-boot firmware environment 302 publishes the CMS data for use by higher-level software such as the operating system 314. The firmware environment 302 may use any technique to make the CMS data available to software executed by the computing device 100 after the pre-boot firmware environment 302 is no longer in control of the computing device 100 (e.g., after exiting the pre-EFI initialization environment, calling ExitBootServices, or other event). In some embodiments, in block 418 the computing device 100 may publish the CMS data in one or more firmware tables. For example, the computing device 100 may publish the CMS data in an advanced configuration and power interface (ACPI) firmware table, such as the memory rank health table (MRHT) 310. Each entry of the MRHT 310 may identify the memory rank 204, the assigned physical memory address range for the memory rank 204, and the CMS value for the memory rank 204. One potential embodiment of the MRHT 310 with two rank domain entries is illustrated below in Table 1. As another example, the CMS data may be published in one or more SMBIOS tables and/or any other data structure that is agreed to be placed in a particular location by the pre-boot firmware environment 302 and the operating system 314. In some embodiments, in block 420 the computing device 100 may install a firmware interface to access the CMS data. For example, the computing device 100 may install a unified extensible firmware interface (UEFI) runtime protocol that may be used by the operating system 314 to access the CMS data.

TABLE 1

Illustrative memory rank health table (MRHT).

| | |
|---|---|
| Signature | "MRHT" |
| Length | 200 |
| Revision | 2 |
| . . . | . . . |
| Number of rank domains detected | 2 |
| Rank Domain Structure 0 | |
| Rank Domain ID | 0 |
| Rank Domain Start | 0x0000000000000000 |
| Rank Domain Size | 0x80000000 |
| Rank Domain Health (CMS) | 0x00E2 |
| Rank Domain Structure 1 | |
| . . . | . . . |

In block 422, the pre-boot firmware environment 302 loads the operating system 314 into one or more physical address ranges that are mapped to high-margin memory ranks 204. Additionally, in some embodiments the pre-boot firmware environment 302 may load other software into high-margin memory ranks 204, such as the SMM 312 or other system software. The computing device 100 may use any appropriate technique to identify the high-margin memory ranks 204. In some embodiments, in block 424 the computing device 100 may identify the physical address ranges with the highest margin using the published CMS data. For example, a boot loader 308 or other firmware component may access the MRHT 310 to identify address ranges with the highest associated CMS value. The particular physical address range with the highest margin may vary from device to device (or even from boot to boot), and therefore the operating system 314 or other software must be relocatable to different physical address ranges. In some embodiments, in block 426, the computing device 100 loads the operating system 314 into a predetermined physical address range that has been previously mapped to a high-margin memory rank 204 as described above in connection with block 414. For example, the computing device 100 may load a non-relocatable Linux kernel or other operating system kernel into the address range 0-2 GB.

Figure 5:
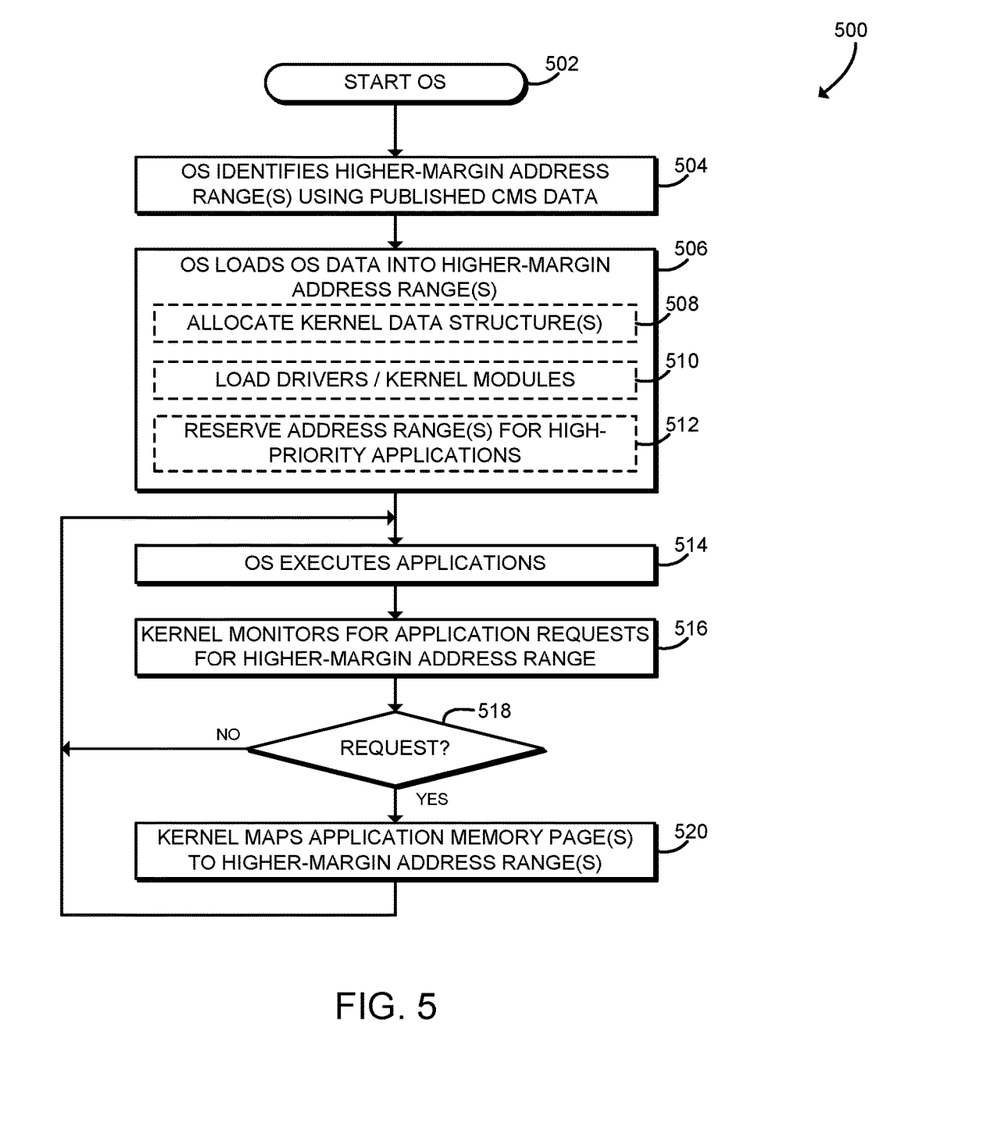
FIG. 5 is a simplified flow diagram of at least one embodiment of a method for runtime memory management that may be executed by the computing device of FIGS. 1-3.

After loading the operating system 314, in block 428 the pre-boot firmware environment 302 of the computing device 100 exits boot services, which passes control of the computing device 100 to the operating system 314. For example, in a UEFI system the computing device 100 may execute the ExitBootServices( ) function to pass control to the operating system 314. After passing control to the operating system 314, the method 400 is complete, and the computing device 100 may proceed to execute a method as shown in FIG. 5. The method 400 may be re-started, for example in response to a platform reset or other power cycle event.

Referring now to FIG. 5, in use, the computing device 100 may execute a method 500 for runtime memory management. It should be appreciated that, in some embodiments, the operations of the method 500 may be performed by one or more components of the environment 300 of the computing device 100 as shown in FIG. 3. The method 500 begins in block 502, in which the computing device 100 starts execution of the operating system 314. As described above, the operating system 314 may be started by the firmware environment 302, for example by a boot loader 308 or other boot target of the computing device 100. After the operating system 314 is started, the operating system 314 is in control of the computing device 100. For example, the firmware environment 302 may call ExitBootServices( ) to pass control to the operating system 314.

In block 504, the operating system 314 of the computing device 100 identifies one or more higher-margin physical address ranges of the memory 124 using published consolidated memory score (CMS) data. Each higher-margin physical address range is mapped to a memory rank 204 with a higher CMS value. The computing device 100 may use any appropriate technique to access the CMS data. For example, the computing device 100 may access an ACPI table such as the MRHT 310 or the computing device 100 may access a runtime firmware protocol to access the CMS data.

In block 506, the operating system 314 of the computing device 100 loads operating system data into the higher-margin memory address ranges. The computing device 100 may use any appropriate technique to select higher-margin memory address ranges. For example, the computing device 100 may start loading data into the free memory address range associated with the highest CMS value. As that memory range is filled, the computing device 100 may select the free memory address range with the next-highest CMS value, and so on. The computing device 100 may load critical operating system data or other high-priority data into the higher-margin address ranges. In some embodiments, in block 508, the computing device 100 may allocate kernel data structures in the higher-margin address ranges. In some embodiments, in block 510, the computing device 100 may load device drivers, kernel modules, or other loadable software into the higher-margin address ranges. In some embodiments, in block 512, the computing device 100 may reserve one or more higher-margin address ranges for high-priority applications 320.

In block 514, the operating system 314 of the computing device 100 executes one or more applications 320. In block 516, the operating system 314 monitors for requests from an application 320 to be loaded in a higher-margin address range. For example, critical system processes, high-availability applications, or other high-priority applications 320 may request to be loaded in a higher-margin address range. Applications 320 may request the operating system 314 for a higher-margin address range using a system call interface or other interface established by the operating system 314.

In block 518, the operating system 314 determines whether a request to be loaded in a higher-margin address range has been received. If not, the method 500 loops back to block 514 to continue executing applications 320. If a request to be loaded in a higher-margin address range has been received, the method 500 advances to block 520, in which the operating system 314 kernel maps one or more memory pages of the application 320 into a higher-margin physical address range. The computing device 100 may use any technique to identify the higher-margin physical address range. For example, the computing device 100 may map the application into a higher-margin address range that was previously reserved as described above in connection with block 512. As another example, the computing device 100 may use the CMS data to identify a free address range with the highest associated CMS value. After mapping the application 320 to the higher-margin address range, the method 500 loops back to block 514 to continue executing the applications 320.

Although illustrated in FIGS. 4-5 as being executed by a UEFI-based firmware environment 302 and an operating system 314, it should be understood that in some embodiments, the operations of those methods may be performed by a different type or number of system components. For example, in some embodiments the computing device 100 may include a non-UEFI firmware environment, such as a legacy BIOS. As another example, in some embodiments the operations of the methods 400, 500 may be performed by a bare metal operating system without a separate firmware environment.

Figure 6:
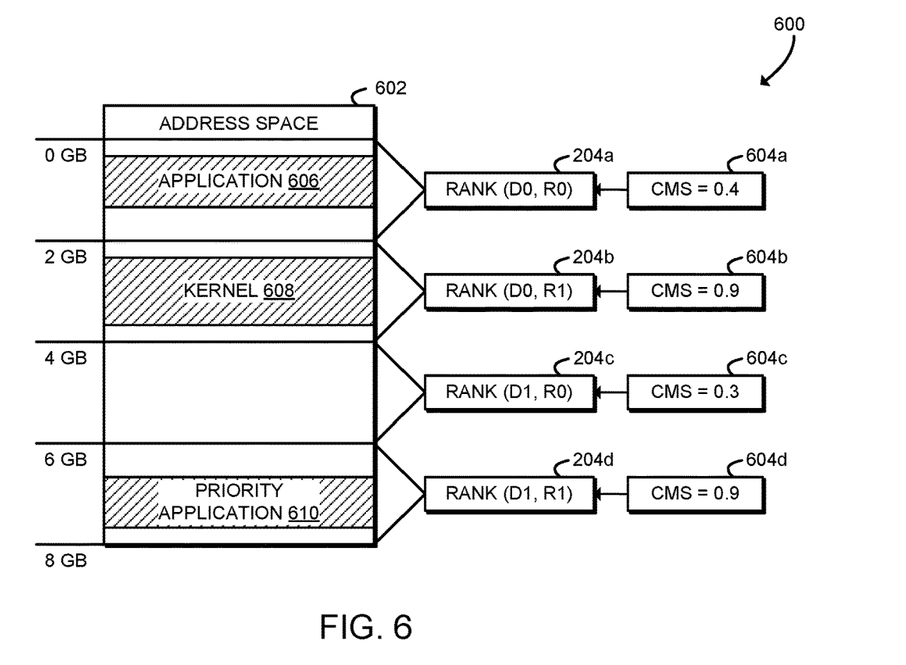
FIG. 6 is a schematic diagram of at least one embodiment of an address space that may be established by the computing device of FIGS. 1-3.

Referring now to FIG. 6, diagram 600 illustrates a potential embodiment of memory management that may be established by the computing device 100. As shown, the computing device 100 establishes an address space 602, which is illustrated as a series of physical address ranges from 0 GB to 8 GB. Of course, in some embodiments the address space 602 may be noncontiguous and/or include reserved ranges such as an MMIO range. Each range of the address space 602 is mapped to a memory rank 204, and each memory rank 204 has a corresponding CMS value 604. Illustratively, the ranks 204 have been mapped to the physical address space in a topological order based on the number of the particular module 202 (i.e., DIMM) and rank 204 within that module 202. In particular, the range 0-2 GB has been mapped to DIMM 0, rank 0, which is labeled rank 204a; the range 2-4 GB has been mapped to DIMM 0, rank 1, which is labeled rank 204b; the range 4-6 GB has been mapped to DIMM 1, rank 0, which is labeled rank 204c; and the range 6-8 GB has been mapped to DIMM 1, rank 1, which is labeled rank 204d.

As shown, the address space 602 includes an application 606, an operating system kernel 608, and a priority application 610. The operating system kernel 608 is loaded in the range 2-4 GB, corresponding to the rank 204b, which has the highest CMS value 604b. The operating system kernel 608 may be loaded into the higher-margin 2-4 GB range by the firmware environment 302 as described above in connection with block 422 of FIG. 4 and/or by other components of the operating system 314 as described above in connection with block 506 of FIG. 5. Similarly, the priority application 610 is loaded in the range 6-8 GB, corresponding to the rank 204d, which also has the highest CMS value 604d. The priority application 610 may be loaded into the higher-margin 6-8 GB range by the operating system 314 as described above in connection with block 520 of FIG. 5. The application 606 is not a high-priority application. Thus, the application 606 is loaded in the range 0-2 GB, corresponding to the rank 204a, which has a lower CMS value 604a.

Figure 7:
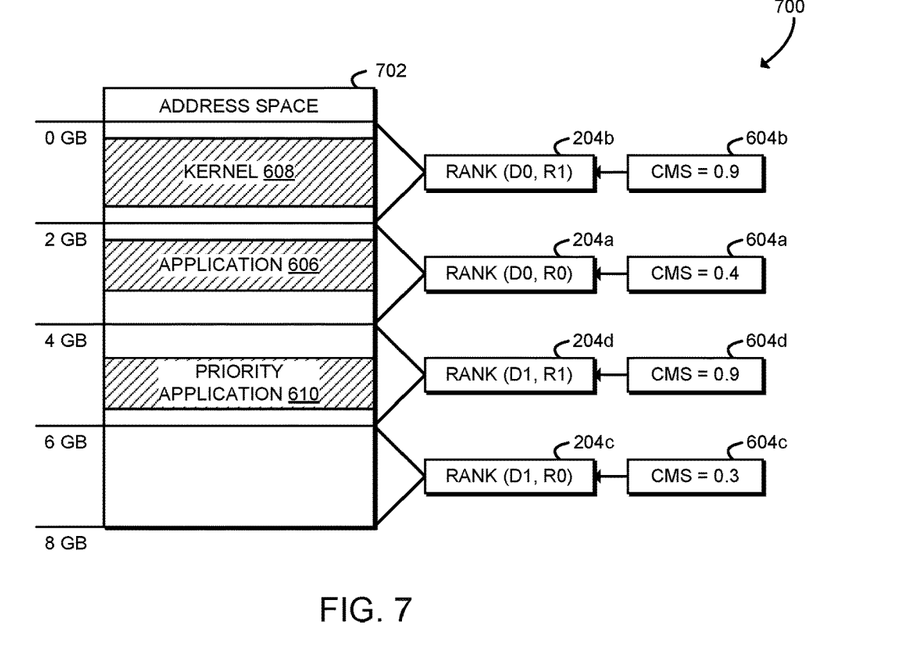
FIG. 7 is a schematic diagram of at least one embodiment of another address space that may be established by the computing device of FIGS. 1-3.

Referring now to FIG. 7, diagram 700 illustrates another potential embodiment of memory management that may be established by the computing device 100. As shown, the computing device 100 establishes an address space 702, which is illustrated as a series of physical address ranges from 0 GB to 8 GB. Of course, in some embodiments the address space 702 may be noncontiguous and/or include reserved ranges such as an MMIO range. Each range of the address space 702 is mapped to a memory rank 204, and each memory rank 204 has a corresponding CMS value 604. Note that the memory ranks 204 are associated with the same CMS values 604 as shown in FIG. 6. The ranks 204 have been mapped to the physical address space 702 so that higher-margin memory ranks 204 are mapped to a predetermined address range, as described above in connection with block 414 of FIG. 4. In particular, the range 0-2 GB has been mapped to DIMM 0, rank 1, which is labeled rank 204b; the range 2-4 GB has been mapped to DIMM 0, rank 0, which is labeled rank 204a; the range 4-6 GB has been mapped to DIMM 1, rank 1, which is labeled rank 204d; and the range 6-8 GB has been mapped to DIMM 1, rank 0, which is labeled rank 204c.

As shown, the address space 702 also includes the application 606, the operating system kernel 608, and the priority application 610. The operating system kernel 608 is loaded in the range 0-2 GB, corresponding to the rank 204b, which has the highest CMS value 604b. The operating system kernel 608 may be loaded into the 0-2 GB range by the firmware environment 302 as described above in connection with block 426 of FIG. 4. Because the 0-2 GB range is predetermined, the operating system kernel 608 may be non-relocatable or otherwise expect to be loaded in the range 0-2 GB. The priority application 610 is loaded in the range 4-6 GB, corresponding to the rank 204d, which also has the highest CMS value 604d. The priority application 610 may be loaded into the higher-margin 6-8 GB range by the operating system 314 as described above in connection with block 520 of FIG. 5. The application 606 is not a high-priority application. Thus, the application 606 is loaded in the range 2-4 GB, corresponding to the rank 204a, which has a lower CMS value 604a.

It should be appreciated that, in some embodiments, the methods 400 and/or 500 may be embodied as various instructions stored on a computer-readable media, which may be executed by the processor 120, the I/O subsystem 122, and/or other components of the computing device 100 to cause the computing device 100 to perform the method 400 and/or 500, respectively. The computer-readable media may be embodied as any type of media capable of being read by the computing device 100 including, but not limited to, the memory 124, the data storage device 126, firmware devices, other memory or data storage devices of the computing device 100, portable media readable by a peripheral device 130 of the computing device 100, and/or other media.

EXAMPLES

Illustrative examples of the technologies disclosed herein are provided below. An embodiment of the technologies may include any one or more, and any combination of, the examples described below.

Example 1 includes a computing device for reliable software execution, the computing device comprising: a memory that includes a plurality of ranks; a memory initializer to train the plurality of ranks of the memory; a rank margining tool to determine a consolidated memory score for each rank of the plurality of ranks in response to training of the plurality of ranks, wherein each consolidated memory score is indicative of a margin of the corresponding rank; and a boot loader to (i) identify a higher-margin memory address range with the consolidated memory scores, wherein the higher-margin memory address range is mapped to a higher-margin memory rank, and (ii) load a high-priority software component into the higher-margin memory address range.

Example 2 includes the subject matter of Example 1, and wherein to determine the consolidated memory score comprises to determine a timing margin and to determine a voltage margin for the corresponding rank.

Example 3 includes the subject matter of any of Examples 1 and 2, and wherein to determine the consolidated memory score comprises to: determine a margin range vector, wherein each element of the margin range vector comprises a normalized margin value; and determine a weighted average of the elements of the margin range vector.

Example 4 includes the subject matter of any of Examples 1-3, and wherein to determine the consolidated memory score comprises to determine an average consolidated memory score for each interleaved memory domain of the computing device.

Example 5 includes the subject matter of any of Examples 1-4, and wherein the computing device further comprises a pre-boot firmware environment that establishes the memory initializer and the rank margining tool.

Example 6 includes the subject matter of any of Examples 1-5, and wherein the rank margining tool is further to publish the plurality of consolidated memory scores to a higher-level software component of the computing device.

Example 7 includes the subject matter of any of Examples 1-6, and wherein to publish the plurality of consolidated memory scores comprises to export the plurality of consolidated memory scores to a firmware table.

Example 8 includes the subject matter of any of Examples 1-7, and wherein to publish the plurality of consolidated memory scores comprises to install a firmware interface to access the plurality of consolidated memory scores.

Example 9 includes the subject matter of any of Examples 1-8, and wherein to load the high-priority software component into the higher-margin memory address range comprises to load a system management mode firmware component into the higher-margin memory address range.

Example 10 includes the subject matter of any of Examples 1-9, and further comprising an operating system; wherein the pre-boot firmware environment further comprises the boot loader; and the boot loader is to load the operating system into the higher-margin memory address range.

Example 11 includes the subject matter of any of Examples 1-10, and wherein: the boot loader is further to map the higher-margin memory address range to the higher-margin memory rank, wherein the higher-margin memory address range comprises a predetermined address range; and to load the operating system comprises to load the operating system into the predetermined address range in response to mapping of the higher-margin memory address range to the higher-margin memory rank.

Example 12 includes the subject matter of any of Examples 1-11, and further comprising a runtime loader to: identify the higher-margin memory address range with the consolidated memory scores in response to loading of the operating system; and load a second high-priority software component into the higher-margin memory address range; wherein the operating system is to establish the runtime loader.

Example 13 includes the subject matter of any of Examples 1-12, and wherein to identify the higher-margin memory address range comprises to access the plurality of consolidated memory scores published by the pre-boot firmware environment.

Example 14 includes the subject matter of any of Examples 1-13, and wherein to load the second high-priority software component comprises to load a kernel data structure, a kernel module, or a kernel-mode driver into the higher-margin memory address range.

Example 15 includes the subject matter of any of Examples 1-14, and further comprising: a user-mode application; and a scheduler to execute the user-mode application, wherein the scheduler is established by the operating system; wherein the user-mode application is to request the operating system to load the user-mode application to a higher-margin memory address range in response to execution of the user-mode application; and wherein to load the second high-priority software component comprises to load the user-mode application into the higher-margin memory address range in response to a request for the operating system to load the user-mode application.

Example 16 includes the subject matter of any of Examples 1-15, and wherein to load the user-mode application into the higher-margin memory address range comprises to map one or more memory pages of the user-mode application to the higher-margin memory address range.

Example 17 includes a method for reliable software execution, the method comprising: training, by a computing device, a plurality of ranks of a memory of the computing device; determining, by the computing device, a consolidated memory score for each rank of the plurality of ranks in response to training the plurality of ranks, wherein each consolidated memory score is indicative of a margin of the corresponding rank; identifying, by the computing device, a higher-margin memory address range using the consolidated memory scores, wherein the higher-margin memory address range is mapped to a higher-margin memory rank; and loading, by the computing device, a high-priority software component into the higher-margin memory address range.

Example 18 includes the subject matter of Example 17, and wherein determining the consolidated memory score comprises determining a timing margin and determining a voltage margin for the corresponding rank.

Example 19 includes the subject matter of any of Examples 17 and 18, and wherein determining the consolidated memory score comprises: determining a margin range vector, wherein each element of the margin range vector comprises a normalized margin value; and determining a weighted average of the elements of the margin range vector.

Example 20 includes the subject matter of any of Examples 17-19, and wherein determining the consolidated memory score comprises determining an average consolidated memory score for each interleaved memory domain of the computing device.

Example 21 includes the subject matter of any of Examples 17-20, and wherein: training the plurality of ranks of the memory device comprises training the plurality of ranks of the memory by a pre-boot firmware environment of the computing device; and determining the consolidated memory score for each rank comprises determining the consolidated memory score for each rank by the pre-boot firmware environment.

Example 22 includes the subject matter of any of Examples 17-21, and further comprising publishing, by the pre-boot firmware environment, the plurality of consolidated memory scores to a higher-level software component of the computing device.

Example 23 includes the subject matter of any of Examples 17-22, and wherein publishing the plurality of consolidated memory scores comprises exporting the plurality of consolidated memory scores to a firmware table.

Example 24 includes the subject matter of any of Examples 17-23, and wherein publishing the plurality of consolidated memory scores comprises installing a firmware interface to access the plurality of consolidated memory scores.

Example 25 includes the subject matter of any of Examples 17-24, and wherein loading the high-priority software component into the higher-margin memory address range comprises loading, by the pre-boot firmware environment, a system management mode firmware component into the higher-margin memory address range.

Example 26 includes the subject matter of any of Examples 17-25, and wherein loading the high-priority software component into the higher-margin memory address range comprises loading, by the pre-boot firmware environment, an operating system into the higher-margin memory address range.

Example 27 includes the subject matter of any of Examples 17-26, and further comprising: mapping, by the pre-boot firmware environment, the higher-margin memory address range to the higher-margin memory rank, wherein the higher-margin memory address range comprises a predetermined address range; wherein loading the operating system comprises loading the operating system into the predetermined address range in response to mapping the higher-margin memory address range to the higher-margin memory rank.

Example 28 includes the subject matter of any of Examples 17-27, and further comprising: identifying, by the operating system, the higher-margin memory address range using the consolidated memory scores in response to loading the operating system; and loading, by the operating system, a second high-priority software component into the higher-margin memory address range.

Example 29 includes the subject matter of any of Examples 17-28, and wherein identifying the higher-margin memory address range comprises accessing the plurality of consolidated memory scores published by the pre-boot firmware environment.

Example 30 includes the subject matter of any of Examples 17-29, and wherein loading the second high-priority software component comprises loading a kernel data structure, a kernel module, or a kernel-mode driver into the higher-margin memory address range.

Example 31 includes the subject matter of any of Examples 17-30, and further comprising: executing, by the operating system, a user-mode application; and requesting, by the user-mode application, the operating system to load the user-mode application to a higher-margin memory address range in response to executing the user-mode application; wherein loading the second high-priority software component comprises loading the user-mode application into the higher-margin memory address range in response to requesting the operating system to load the user-mode application.

Example 32 includes the subject matter of any of Examples 17-31, and wherein loading the user-mode application into the higher-margin memory address range comprises mapping one or more memory pages of the user-mode application to the higher-margin memory address range.

Example 33 includes a computing device comprising: a processor; and a memory having stored therein a plurality of instructions that when executed by the processor cause the computing device to perform the method of any of Examples 17-32.

Example 34 includes one or more machine readable storage media comprising a plurality of instructions stored thereon that in response to being executed result in a computing device performing the method of any of Examples 17-32.

Example 35 includes a computing device comprising means for performing the method of any of Examples 17-32.

Example 36 includes a computing device for reliable software execution, the computing device comprising: means for training a plurality of ranks of a memory of the computing device; means for determining a consolidated memory score for each rank of the plurality of ranks in response to training the plurality of ranks, wherein each consolidated memory score is indicative of a margin of the corresponding rank; means for identifying a higher-margin memory address range using the consolidated memory scores, wherein the higher-margin memory address range is mapped to a higher-margin memory rank; and means for loading a high-priority software component into the higher-margin memory address range.

Example 37 includes the subject matter of Example 36, and wherein the means for determining the consolidated memory score comprises means for determining a timing margin and determining a voltage margin for the corresponding rank.

Example 38 includes the subject matter of any of Examples 36 and 37, and wherein the means for determining the consolidated memory score comprises: means for determining a margin range vector, wherein each element of the margin range vector comprises a normalized margin value; and means for determining a weighted average of the elements of the margin range vector.

Example 39 includes the subject matter of any of Examples 36-38, and wherein the means for determining the consolidated memory score comprises means for determining an average consolidated memory score for each interleaved memory domain of the computing device.

Example 40 includes the subject matter of any of Examples 36-39, and wherein: the means for training the plurality of ranks of the memory device comprises means for training the plurality of ranks of the memory by a pre-boot firmware environment of the computing device; and the means for determining the consolidated memory score for each rank comprises means for determining the consolidated memory score for each rank by the pre-boot firmware environment.

Example 41 includes the subject matter of any of Examples 36-40, and further comprising means for publishing, by the pre-boot firmware environment, the plurality of consolidated memory scores to a higher-level software component of the computing device.

Example 42 includes the subject matter of any of Examples 36-41, and wherein the means for publishing the plurality of consolidated memory scores comprises means for exporting the plurality of consolidated memory scores to a firmware table.

Example 43 includes the subject matter of any of Examples 36-42, and wherein the means for publishing the plurality of consolidated memory scores comprises means for installing a firmware interface to access the plurality of consolidated memory scores.

Example 44 includes the subject matter of any of Examples 36-43, and wherein the means for loading the high-priority software component into the higher-margin memory address range comprises means for loading, by the pre-boot firmware environment, a system management mode firmware component into the higher-margin memory address range.

Example 45 includes the subject matter of any of Examples 36-44, and wherein the means for loading the high-priority software component into the higher-margin memory address range comprises means for loading, by the pre-boot firmware environment, an operating system into the higher-margin memory address range.

Example 46 includes the subject matter of any of Examples 36-45, and further comprising: means for mapping, by the pre-boot firmware environment, the higher-margin memory address range to the higher-margin memory rank, wherein the higher-margin memory address range comprises a predetermined address range; wherein the means for loading the operating system comprises means for loading the operating system into the predetermined address range in response to mapping the higher-margin memory address range to the higher-margin memory rank.

Example 47 includes the subject matter of any of Examples 36-46, and further comprising: means for identifying, by the operating system, the higher-margin memory address range using the consolidated memory scores in response to loading the operating system; and means for loading, by the operating system, a second high-priority software component into the higher-margin memory address range.

Example 48 includes the subject matter of any of Examples 36-47, and wherein the means for identifying the higher-margin memory address range comprises means for accessing the plurality of consolidated memory scores published by the pre-boot firmware environment.

Example 49 includes the subject matter of any of Examples 36-48 and wherein the means for loading the second high-priority software component comprises means for loading a kernel data structure, a kernel module, or a kernel-mode driver into the higher-margin memory address range.

Example 50 includes the subject matter of any of Examples 36-49, and further comprising: means for executing, by the operating system, a user-mode application; and means for requesting, by the user-mode application, the operating system to load the user-mode application to a higher-margin memory address range in response to executing the user-mode application; wherein the means for loading the second high-priority software component comprises means for loading the user-mode application into the higher-margin memory address range in response to requesting the operating system to load the user-mode application.

Example 51 includes the subject matter of any of Examples 36-50, and wherein the means for loading the user-mode application into the higher-margin memory address range comprises means for mapping one or more memory pages of the user-mode application to the higher-margin memory address range.

The invention claimed is:

1. A computing device for reliable software execution, the computing device comprising:
a memory that includes a plurality of ranks;
a memory initializer to train the plurality of ranks of the memory;
a rank margining tool to determine a consolidated memory score for each rank of the plurality of ranks in response to training of the plurality of ranks, wherein each consolidated memory score is indicative of a margin of the corresponding rank; and
a boot loader to (i) identify a higher-margin memory address range with the consolidated memory scores, wherein the higher-margin memory address range is mapped to a higher-margin memory rank, and (ii) load a high-priority software component into the higher-margin memory address range.

2. The computing device of claim 1, wherein to determine the consolidated memory score comprises to determine a timing margin and to determine a voltage margin for the corresponding rank.

3. The computing device of claim 2, wherein to determine the consolidated memory score comprises to:
determine a margin range vector, wherein each element of the margin range vector comprises a normalized margin value; and
determine a weighted average of the elements of the margin range vector.

4. The computing device of claim 1, wherein the computing device further comprises a pre-boot firmware environment that establishes the memory initializer and the rank margining tool.

5. The computing device of claim 4, wherein the rank margining tool is further to publish the plurality of consolidated memory scores to a higher-level software component of the computing device.

6. The computing device of claim 4, further comprising an operating system;
wherein the pre-boot firmware environment further comprises the boot loader; and
the boot loader is to load the operating system into the higher-margin memory address range.

7. The computing device of claim 6, wherein:
the boot loader is further to map the higher-margin memory address range to the higher-margin memory rank, wherein the higher-margin memory address range comprises a predetermined address range; and to load the operating system comprises to load the operating system into the predetermined address range in response to mapping of the higher-margin memory address range to the higher-margin memory rank.

8. The computing device of claim 6, further comprising a runtime loader to:
identify the higher-margin memory address range with the consolidated memory scores in response to loading of the operating system; and
load a second high-priority software component into the higher-margin memory address range;
wherein the operating system is to establish the runtime loader.

9. The computing device of claim 8, wherein to identify the higher-margin memory address range comprises to access the plurality of consolidated memory scores published by the pre-boot firmware environment.

10. The computing device of claim 8, wherein to load the second high-priority software component comprises to load a kernel data structure, a kernel module, or a kernel-mode driver into the higher-margin memory address range.

11. The computing device of claim 8, further comprising:
a user-mode application; and
a scheduler to execute the user-mode application, wherein the scheduler is established by the operating system;
wherein the user-mode application is to request the operating system to load the user-mode application to a higher-margin memory address range in response to execution of the user-mode application; and
wherein to load the second high-priority software component comprises to load the user-mode application into the higher-margin memory address range in response to a request for the operating system to load the user-mode application.

12. A method for reliable software execution, the method comprising:
training, by a computing device, a plurality of ranks of a memory of the computing device;
determining, by the computing device, a consolidated memory score for each rank of the plurality of ranks in response to training the plurality of ranks, wherein each consolidated memory score is indicative of a margin of the corresponding rank;
identifying, by the computing device, a higher-margin memory address range using the consolidated memory scores, wherein the higher-margin memory address range is mapped to a higher-margin memory rank; and
loading, by the computing device, a high-priority software component into the higher-margin memory address range.

13. The method of claim 12, wherein determining the consolidated memory score comprises determining a timing margin and determining a voltage margin for the corresponding rank.

14. The method of claim 12, wherein:
training the plurality of ranks of the memory device comprises training the plurality of ranks of the memory by a pre-boot firmware environment of the computing device; and
determining the consolidated memory score for each rank comprises determining the consolidated memory score for each rank by the pre-boot firmware environment.

15. The method of claim 14, further comprising publishing, by the pre-boot firmware environment, the plurality of consolidated memory scores to a higher-level software component of the computing device.

16. The method of claim 14, wherein loading the high-priority software component into the higher-margin memory address range comprises loading, by the pre-boot firmware environment, an operating system into the higher-margin memory address range.

17. The method of claim 16, further comprising:
mapping, by the pre-boot firmware environment, the higher-margin memory address range to the higher-margin memory rank, wherein the higher-margin memory address range comprises a predetermined address range;
wherein loading the operating system comprises loading the operating system into the predetermined address range in response to mapping the higher-margin memory address range to the higher-margin memory rank.

18. The method of claim 16, further comprising:
identifying, by the operating system, the higher-margin memory address range using the consolidated memory scores in response to loading the operating system; and
loading, by the operating system, a second high-priority software component into the higher-margin memory address range.

19. One or more non-transitory, computer-readable storage media comprising a plurality of instructions that in response to being executed cause a computing device to:
train a plurality of ranks of a memory of the computing device;
determine a consolidated memory score for each rank of the plurality of ranks in response to training the plurality of ranks, wherein each consolidated memory score is indicative of a margin of the corresponding rank;
identify a higher-margin memory address range using the consolidated memory scores, wherein the higher-margin memory address range is mapped to a higher-margin memory rank; and
load a high-priority software component into the higher-margin memory address range.

20. The one or more non-transitory, computer-readable storage media of claim 19, wherein to determine the consolidated memory score comprises to determine a timing margin and determine a voltage margin for the corresponding rank.

21. The one or more non-transitory, computer-readable storage media of claim 19, wherein:
to train the plurality of ranks of the memory device comprises to train the plurality of ranks of the memory by a pre-boot firmware environment of the computing device; and
to determine the consolidated memory score for each rank comprises to determine the consolidated memory score for each rank by the pre-boot firmware environment.

22. The one or more non-transitory, computer-readable storage media of claim 21, further comprising a plurality of instructions that in response to being executed cause the computing device to publish, by the pre-boot firmware environment, the plurality of consolidated memory scores to a higher-level software component of the computing device.

23. The one or more non-transitory, computer-readable storage media of claim 21, wherein to load the high-priority software component into the higher-margin memory address range comprises to load, by the pre-boot firmware environment, an operating system into the higher-margin memory address range.

24. The one or more non-transitory, computer-readable storage media of claim 23, further comprising a plurality of instructions that in response to being executed cause the computing device to:
- map, by the pre-boot firmware environment, the higher-margin memory address range to the higher-margin memory rank, wherein the higher-margin memory address range comprises a predetermined address range;
- wherein to load the operating system comprises to load the operating system into the predetermined address range in response to mapping the higher-margin memory address range to the higher-margin memory rank.

25. The one or more non-transitory, computer-readable storage media of claim 23, further comprising a plurality of instructions that in response to being executed cause the computing device to:
- identify, by the operating system, the higher-margin memory address range using the consolidated memory scores in response to loading the operating system; and
- load, by the operating system, a second high-priority software component into the higher-margin memory address range.

* * * * *